United States Patent
Mermoud et al.

(10) Patent No.: US 9,547,828 B2
(45) Date of Patent: Jan. 17, 2017

(54) HIERARCHICAL HYBRID BATCH-INCREMENTAL LEARNING

(71) Applicant: Cisco Technology, Inc., San Jose, CA (US)

(72) Inventors: Grégory Mermoud, Veyras (CH); Jean-Philippe Vasseur, Saint Martin d'Uriage (FR); Diane Bouchacourt, Paris (FR)

(73) Assignee: Cisco Technology, Inc., San Jose, CA (US)

( * ) Notice: Subject to any disclaimer, the term of this patent is extended or adjusted under 35 U.S.C. 154(b) by 322 days.

(21) Appl. No.: 14/120,371

(22) Filed: May 14, 2014

(65) Prior Publication Data

US 2015/0332165 A1    Nov. 19, 2015

(51) Int. Cl.
*G06F 17/00* (2006.01)
*G06N 5/02* (2006.01)
*G06N 99/00* (2010.01)
*G06N 5/04* (2006.01)
*H04L 29/08* (2006.01)
*H04L 12/70* (2013.01)
*H04L 12/26* (2006.01)
(Continued)

(52) U.S. Cl.
CPC ............ *G06N 99/005* (2013.01); *G06N 5/048* (2013.01); *H04L 43/08* (2013.01); *H04L 45/02* (2013.01); *H04L 45/70* (2013.01); *H04L 47/00* (2013.01); *H04L 67/10* (2013.01)

(58) Field of Classification Search
CPC combination set(s) only.
See application file for complete search history.

(56) References Cited

U.S. PATENT DOCUMENTS 9,112,782 B2 * 8/2015 Siddiqui ................... G06F 9/46
9,218,216 B2 * 12/2015 Vasseur ................ H04L 41/142
9,338,065 B2 * 5/2016 Vasseur ............... H04L 41/5009
(Continued)

FOREIGN PATENT DOCUMENTS

WO    WO-2013/014672 A1    1/2013

OTHER PUBLICATIONS

Predicting the Quality of Experience for Internet Video with Fuzzy Decision Tree Yuran Zhang; Ting Yue; Hongbo Wang; Anming Wei Computational Science and Engineering (CSE), 2014 IEEE 17th International Conference on Year: 2014 pp. 1181-1187, DOI: 10.1109/CSE.2014.230 IEEE Conference Publications.*
(Continued)

*Primary Examiner* — Michael B Holmes
(74) *Attorney, Agent, or Firm* — Parker Ibrahim & Berg LLC; James M. Behmke; Stephen D. LeBarron

(57) ABSTRACT

In one embodiment, a machine learning model for predicting one or more metrics is run in a network which includes a centralized controller device interconnected with a plurality of edge devices. A batch version of the machine learning model that operates in batch mode is hosted at the centralized controller device. Then, an incremental version of the machine learning model that operates in incremental mode is pushed to an edge device of the plurality of edge devices, such that the incremental version of the machine learning model is hosted at the edge device. As a result, the batch version and the incremental version of the machine learning model run in parallel with one another.

23 Claims, 10 Drawing Sheets

(51) Int. Cl.
H04L 12/721 (2013.01)
H04L 12/751 (2013.01)

(56) References Cited

U.S. PATENT DOCUMENTS

| | | | |
|---|---|---|---|
| 9,369,351 B2* | 6/2016 | Di Pietro | H04L 41/5025 |
| 9,398,035 B2* | 7/2016 | Vasseur | G06N 99/005 |
| 9,411,916 B2* | 8/2016 | Cruz Mota | G06F 17/5009 |

OTHER PUBLICATIONS

Towards optimising Wi-Fi energy consumption in mobile phones: A data driven approach H. M. K. G Bandara; H. A. Caldera Advances in ICT for Emerging Regions (ICTer), 2015 Fifteenth International Conference on Year: 2015 pp. 226-235, DOI: 10.1109/ICTER.2015. 7377693 IEEE Conference Publications.*

Predicting service metrics for cluster-based services using real-time analytics Rerngvit Yanggratoke; Jawwad Ahmed; John Ardelius; Christofer Flinta; Andreas Johnsson; Daniel Gillblad; Rolf Stadler Network and Service Management (CNSM), 2015 11th International Conference pp. 135-143, DOI: 10.1109/CNSM.2015. 7367349 IEEE Conference Publications.*

Predicting Object Trajectories from High-Speed Streaming Data Nikolaos Zorbas; Dimitrios Zissis; Konstantinos Tserpes; Dimosthenis Anagnostopoulos Trustcom/BigDataSE/ISPA, 2015 IEEE Year: 2015, vol. 2 pp. 229-234, DOI: 10.1109/Trustcom.2015. 588 IEEE Conference Publications.*

Gnawali, et al., "The Minimum Rank with Hysteresis Objective Function", Request for Comments 6719, Sep. 2012, 13 pages, Internet Engineering Task Force Trust.

Thubert, P., "Objective Function Zero for the Routing Protocol for Low-Power and Lossy Networks (RPL)", Request for Comments 6552, Mar. 2012, 14 pages, Internet Engineering Task Force Trust.

Vasseur, et al., "Routing Metrics Used for Path Calculation in Low-Power and Lossy Networks", Request for Comments 6551, Mar. 2012, 30 pages, Internet Engineering Task Force Trust.

Winter; et al., "RPL: IPv6 Routing Protocol for Low-Power and Lossy Networks", Request for Comments 6550, Mar. 2012, 157 pages, Internet Engineering Task Force.

Rajasegarar, S. et al.: "Anomaly detection in wireless sensor networks," IEEE Wireless Communications, IEEE Service Center, Piscataway, NJ, US, vol. 15, No. 4, Aug. 31, 2008, pp. 34-40.

Bhuyan, Monowar Hussain et al.: "Survey on incremental approaches for network anomaly detection," International Journal of Communication Networks and Information Security (IJCNIS), Dec. 31, 2011, p. 226.

Read, Jesse et al.: "Batch-Incremental versus Instance-Incremental Learning in Dynamic and Evolving Data," Oct. 25, 2012, Advances in Intelligent Data Analysis XI, Springer Berlin Heidelberg, Berlin, Heidelberg, pp. 313-323.

International Search Report and Written Opinion dated Sep. 23, 2015 in connection with PCT/US2015/029691.

* cited by examiner

HIERARCHICAL HYBRID BATCH-INCREMENTAL LEARNING

TECHNICAL FIELD

The present disclosure relates generally to computer networks, and, more particularly, to hierarchical hybrid batch-incremental learning.

BACKGROUND

Low power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability, etc. One example routing solution to LLN challenges is a protocol called Routing Protocol for LLNs or "RPL," which is a distance vector routing protocol that builds a Destination Oriented Directed Acyclic Graph (DODAG, or simply DAG) in addition to a set of features to bound the control traffic, support local (and slow) repair, etc. The RPL architecture provides a flexible method by which each node performs DODAG discovery, construction, and maintenance.

Learning Machines (LM) are computational entities that rely on one or more machine learning algorithms for performing a task for which they have not been explicitly programmed to perform. In particular, they are capable of adjusting their behavior to their environment. In the context of LLNs, this ability can be very important, as the network often faces changing conditions and requirements that can be too large for being efficiently managed by a network operator.

Many LMs operate in a so-called batch mode, where a large dataset is collected, and the entire dataset is processed at once. However, batch learning algorithms can be very computation- and memory-intensive, and thus, are often not well-suited to real-time systems that need to quickly incorporate fresh incoming data, as are typically the case with devices at the edge, such as routers. As such, batch algorithms can be better suited for operation at a centralized network controller (e.g., in the cloud). On the other hand, other LMs operate in a so-called incremental mode, where the LM knowledge can be incremented with new data points at any time. Incremental learning algorithms are more lightweight and adaptable than their batch mode counterparts, and thus, are better suited for operation at the edge.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
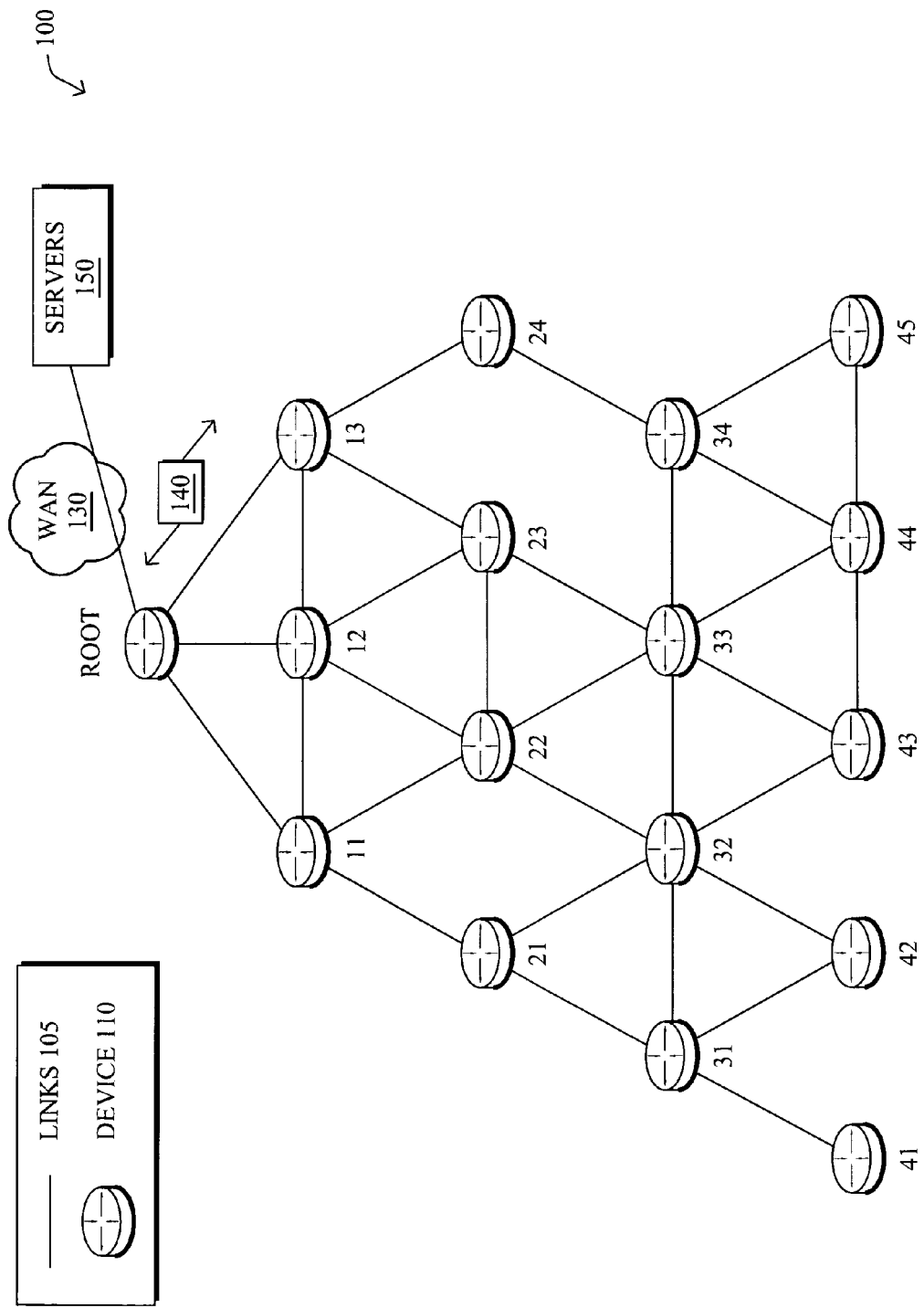
FIG. 1 illustrates an example communication network.

According to one or more embodiments of the disclosure, a machine learning model for predicting one or more metrics is run in a network which includes a centralized controller device interconnected with a plurality of edge devices. A batch version of the machine learning model that operates in batch mode is hosted at the centralized controller device. Then, an incremental version of the machine learning model that operates in incremental mode is pushed to an edge device of the plurality of edge devices, such that the incremental version of the machine learning model is hosted at the edge device. As a result, the batch version and the incremental version of the machine learning model run in parallel with one another.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1 is a schematic block diagram of an example computer network 100 illustratively comprising nodes/devices 110 (e.g., labeled as shown, "root," "11," "12," . . . "45," and described in FIG. 2 below) interconnected by various methods of communication. For instance, the links 105 may be wired links or shared media (e.g., wireless links, PLC links, etc.) where certain nodes 110, such as, e.g., routers, sensors, computers, etc., may be in communication with other nodes 110, e.g., based on distance, signal strength, current operational status, location, etc. The illustrative root node, such as a field area router (FAR) of a FAN, may interconnect the local network with a WAN 130, which may house one or more other relevant devices such as management devices or servers 150, e.g., a network management server (NMS), a dynamic host configuration protocol (DHCP) server, a constrained application protocol (CoAP) server, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets 140 (e.g., traffic and/or messages) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
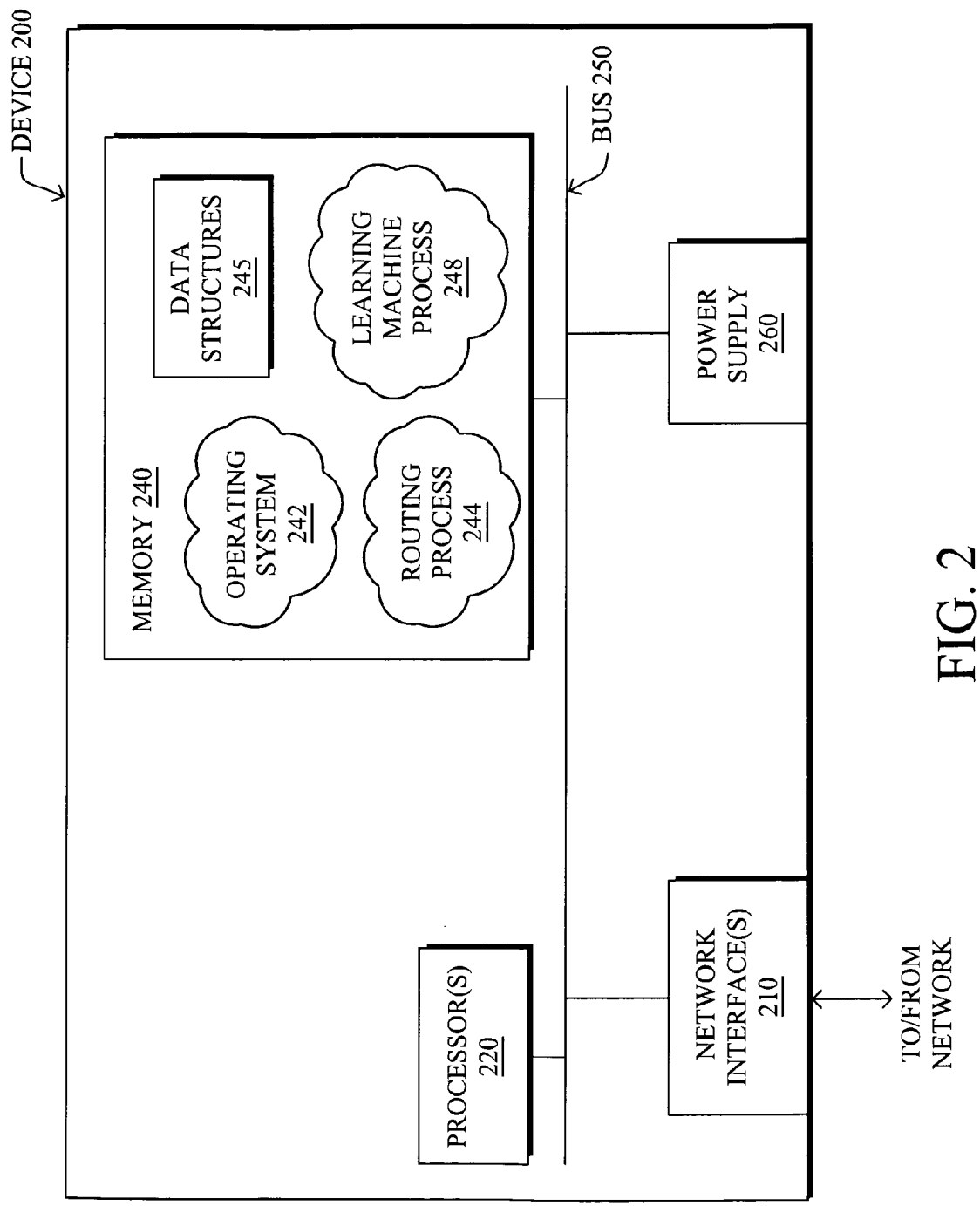
FIG. 2 illustrates an example network device/node.

FIG. 2 is a schematic block diagram of an example node/device 200 that may be used with one or more embodiments described herein, e.g., as any of the nodes or devices shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 include the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC (where the PLC signal may be coupled to the power line feeding into the power supply) the network interface 210 may communicate through the power supply 260, or may be an integral component of the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise a routing process/services 244 and an illustrative "learning machine" process 248, which may be configured depending upon the particular node/device within the network 100 with functionality ranging from intelligent learning machine processes to merely communicating with intelligent learning machines, as described herein. Note also that while the learning machine process 248 is shown in centralized memory 240, alternative embodiments provide for the process to be specifically operated within the network interfaces 210.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 includes computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) including, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Learning machine process 248 includes computer executable instructions executed by the processor 220 to perform various functions, such as smart probing techniques. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes such that M=a*x+b*y+c and the cost function would be the number of misclassified points. The learning process then operates by adjusting the parameters (a, b, c) such that the number of misclassified points is minimal. After this optimization phase (or learning phase), the model M can be used very easily to classify new data points. Often, M is a statistical model, and the cost function is inversely proportional to the likelihood of M, given the input data.

Learning machines (LMs) are computational entities that rely one or more machine learning processes for performing a task for which they haven't been explicitly programmed to perform. In particular, LMs are capable of adjusting their behavior to their environment. In the context of LLNs, and more generally in the context of the IoT (or Internet of Everything, IoE), this ability will be very important, as the network will face changing conditions and requirements, and the network will become too large for efficiently management by a network operator.

As noted above, low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

A DAG is a directed graph having the property that all edges (and/or vertices) are oriented in such a way that no cycles (loops) are supposed to exist. All edges are included in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Further, in certain embodiments, a sibling of a node within a DAG may be defined as any neighboring node which is located at the same rank within a DAG. Note that siblings do not necessarily share a common parent, and routes between siblings are generally not part of a DAG since there is no forward progress (their rank is the same). Note also that a tree is a kind of DAG, where each device/node in the DAG generally has one parent or one preferred parent.

DAGs may generally be built (e.g., by a DAG process) based on an Objective Function (OF). The role of the Objective Function is generally to specify rules on how to build the DAG (e.g. number of parents, backup parents, etc.).

In addition, one or more metrics/constraints may be advertised by the routing protocol to optimize the DAG against. Also, the routing protocol allows for including an optional set of constraints to compute a constrained path, such as if a link or a node does not satisfy a required constraint, it is "pruned" from the candidate list when computing the best path. (Alternatively, the constraints and metrics may be separated from the OF.) Additionally, the routing protocol may include a "goal" that defines a host or set of hosts, such as a host serving as a data collection point, or a gateway providing connectivity to an external infrastructure, where a DAG's primary objective is to have the devices within the DAG be able to reach the goal. In the case where a node is unable to comply with an objective function or does not understand or support the advertised metric, it may be configured to join a DAG as a leaf node. As used herein, the various metrics, constraints, policies, etc., are considered "DAG parameters."

Illustratively, example performance metrics used to select paths (e.g., preferred parents) may comprise cost, delay, latency, bandwidth, expected transmission count (ETX), etc., while example constraints that may be placed on the route selection may comprise various reliability thresholds, restrictions on battery operation, multipath diversity, bandwidth requirements, transmission types (e.g., wired, wireless, etc.). The OF may provide rules defining the load balancing requirements, such as a number of selected parents (e.g., single parent trees or multi-parent DAGs). Notably, an example for how routing metrics and constraints may be obtained may be found in an IETF RFC, entitled "Routing Metrics used for Path Calculation in Low Power and Lossy Networks" <RFC 6551> by Vasseur, et al. (March 2012 version). Further, an example OF (e.g., a default OF) may be found in an IETF RFC, entitled "RPL Objective Function 0" <RFC 6552> by Thubert (March 2012 version) and "The Minimum Rank Objective Function with Hysteresis" <RFC 6719> by O. Gnawali et al. (September 2012 version).

Building a DAG may utilize a discovery mechanism to build a logical representation of the network, and route dissemination to establish state within the network so that routers know how to forward packets toward their ultimate destination. Note that a "router" refers to a device that can forward as well as generate traffic, while a "host" refers to a device that can generate but does not forward traffic. Also, a "leaf" may be used to generally describe a non-router that is connected to a DAG by one or more routers, but cannot itself forward traffic received on the DAG to another router on the DAG. Control messages may be transmitted among the devices within the network for discovery and route dissemination when building a DAG.

According to the illustrative RPL protocol, a DODAG Information Object (DIO) is a type of DAG discovery message that carries information that allows a node to discover a RPL Instance, learn its configuration parameters, select a DODAG parent set, and maintain the upward routing topology. In addition, a Destination Advertisement Object (DAO) is a type of DAG discovery reply message that conveys destination information upwards along the DODAG so that a DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, e.g., following the orientation of the edges within the DAG. Conversely, "downward" or "down" paths are routes that lead in the direction from DAG roots towards leaf nodes, e.g., generally going in the opposite direction to the upward messages within the DAG.

Generally, a DAG discovery request (e.g., DIO) message is transmitted from the root device(s) of the DAG downward toward the leaves, informing each successive receiving device how to reach the root device (that is, from where the request is received is generally the direction of the root). Accordingly, a DAG is created in the upward direction toward the root device. The DAG discovery reply (e.g., DAO) may then be returned from the leaves to the root device(s) (unless unnecessary, such as for UP flows only), informing each successive receiving device in the other direction how to reach the leaves for downward routes. Nodes that are capable of maintaining routing state may aggregate routes from DAO messages that they receive before transmitting a DAO message. Nodes that are not capable of maintaining routing state, however, may attach a next-hop parent address. The DAO message is then sent directly to the DODAG root that can in turn build the topology and locally compute downward routes to all nodes in the DODAG. Such nodes are then reachable using source routing techniques over regions of the DAG that are incapable of storing downward routing state. In addition, RPL also specifies a message called the DIS (DODAG Information Solicitation) message that is sent under specific circumstances so as to discover DAG neighbors and join a DAG or restore connectivity.

Figure 3:
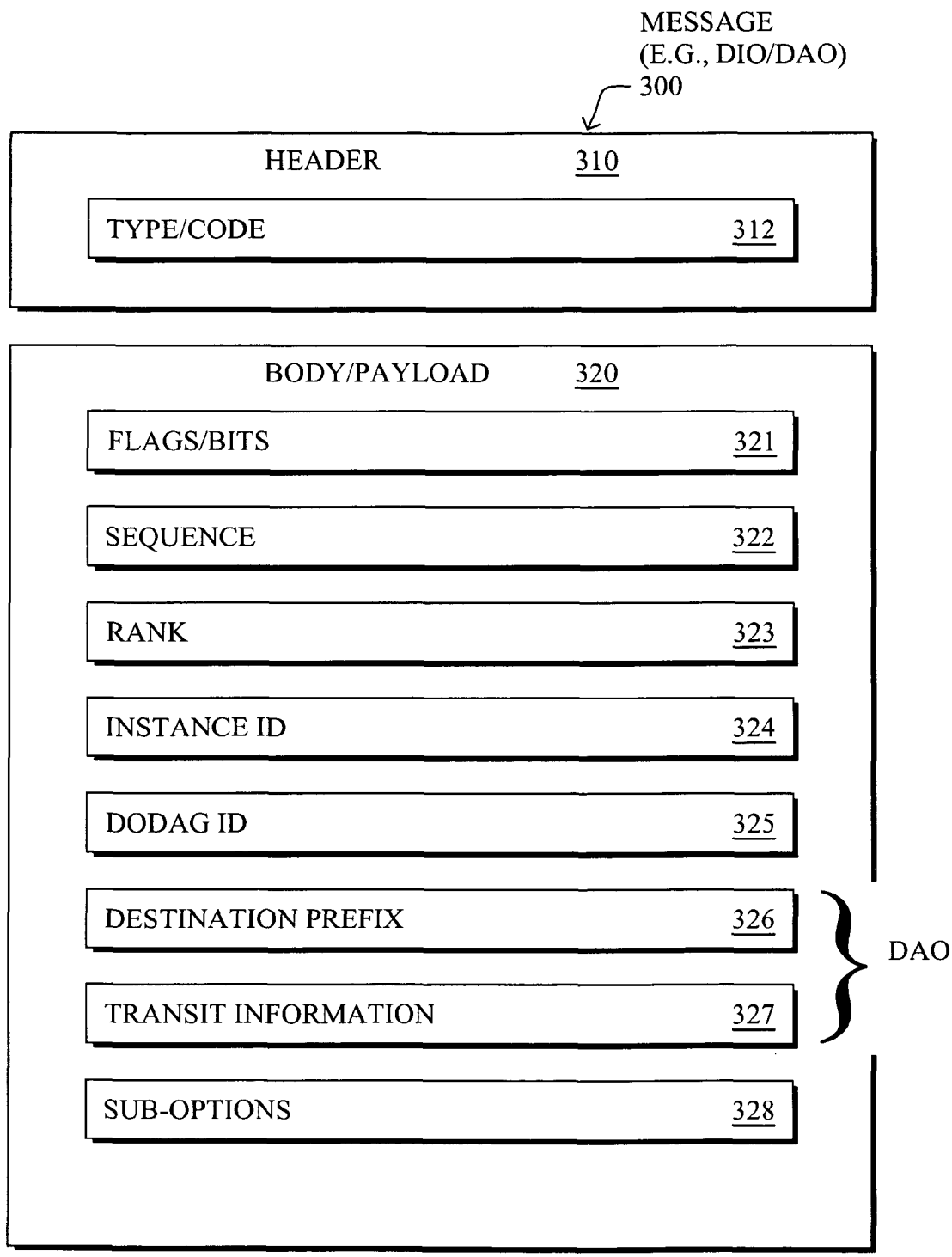
FIG. 3 illustrates an example control message.

FIG. 3 illustrates an example simplified control message format 300 that may be used for discovery and route dissemination when building a DAG, e.g., as a DIO, DAO, or DIS message. Message 300 illustratively comprises a header 310 with one or more fields 312 that identify the type of message (e.g., a RPL control message), and a specific code indicating the specific type of message, e.g., a DIO, DAO, or DIS. Within the body/payload 320 of the message may be a plurality of fields used to relay the pertinent information. In particular, the fields may comprise various flags/bits 321, a sequence number 322, a rank value 323, an instance ID 324, a DODAG ID 325, and other fields, each as may be appreciated in more detail by those skilled in the art. Further, for DAO messages, additional fields for destination prefixes 326 and a transit information field 327 may also be included, among others (e.g., DAO_Sequence used for ACKs, etc.). For any type of message 300, one or more additional sub-option fields 328 may be used to supply additional or custom information within the message 300. For instance, an objective code point (OCP) sub-option field may be used within a DIO to carry codes specifying a particular objective function (OF) to be used for building the associated DAG. Alternatively, sub-option fields 328 may be used to carry other certain information within a message 300, such as indications, requests, capabilities, lists, notifications, etc., as may be described herein, e.g., in one or more type-length-value (TLV) fields.

Figure 4:
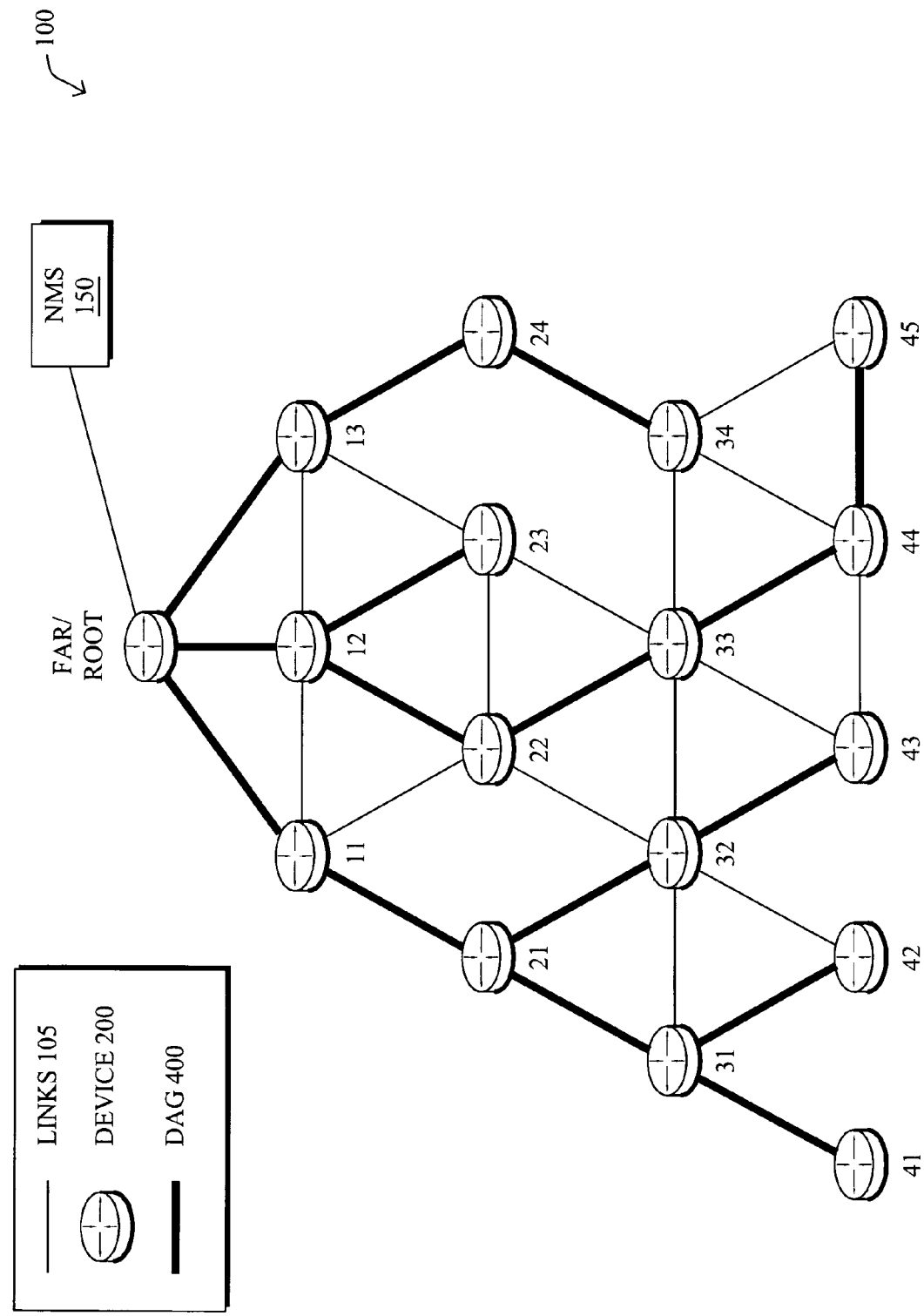
FIG. 4 illustrates an example directed acyclic graph (DAG) in the communication network of FIG. 1.

FIG. 4 illustrates an example simplified DAG that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 410 (shown as bolded lines), which extends from the root node toward one or more leaf nodes (nodes without children). Traffic/packets 140 (shown in FIG. 1) may then traverse the DAG 410 in either the upward direction toward the root or downward toward the leaf nodes, particularly as described herein.

As further noted above, many learning algorithms operate in a so-called batch mode, where a large dataset is collected, and the entire dataset is processed at once. Batch learning algorithms are generally very computation- and memory-intensive, and thus, are not well-suited to real-time systems that need to quickly incorporate fresh incoming data. Also, batch algorithms assume that the input dataset is relatively homogenous, that is, the underlying network conditions remain mostly consistent during the data collection, which has been seen as an invalid assumption in several networks. This assumption is especially not true in IoT networks, where external conditions such as weather and electromagnetic perturbations may suddenly affect the network dynamics.

In embedded and real-time settings, such as in network edge devices (e.g., routers), there is a need for alternative algorithms that have a much smaller memory footprint, that can quickly incorporate new input data, and that adapt quickly to changing network conditions. Such learning algorithms are called incremental, because their knowledge can be incremented with new data points at any time. Also, when using incremental algorithms, data can usually be automatically discarded as it is processed. This process of forgetting past data upon adapting to new input data is characterized by a parameter (or free parameter) called the "forgetting rate."

In spite of these advantages, incremental algorithms can be difficult to tune, and the ability of the algorithm to escape local minima may depend on free parameters such as the forgetting rate. Also, initialization of incremental algorithms can be challenging and subject them even further to local minima, leading the algorithm to stay in a sub-optimal state.

Performances of batch and incremental versions of the same algorithm can differ in terms of relevant performances metrics. For example, the Expectation-Maximization (EM) algorithm finds maximum likelihood estimates of parameters in a hidden-variable model by increasing the log-likelihood of the model. Convergence of the algorithm is attained when the value of the log-likelihood asymptotically converges to a given value L. However, there is no guarantee that this value L corresponds to the actual maximum log-likelihood L* of the model (indeed, L can be a local maximum from which the algorithm is not able to escape). In practice, both batch and incremental versions of the algorithm can get trapped in local maxima. Incremental algorithms have been proven to converge faster than their batch counterpart in some cases, and to escape from local maxima in cases where their batch counterpart can get trapped, particularly during early learning steps. However, incremental algorithms can similarly remain trapped in worst local maxima if the forgetting rate is poorly tuned.

Hierarchical Hybrid Batch-Incremental Learning

The techniques herein provide for a method in which a batch and an incremental version of the same algorithm are run in parallel in the datacenter and at the edge of the network, respectively. The batch version may be initially used to bootstrap the incremental version at the edge. Then, the respective outcome of each algorithm may be compared at regular intervals to ensure reliability of the predictions. Further, mechanisms are disclosed for detecting perturbations in the network dynamics based on a monitoring of the batch algorithm, as well as the appropriate countermeasures to capture these transitions.

Specifically, according to one or more embodiments of the disclosure as described in detail below, a machine learning model for predicting one or more metrics is run in a network which includes a centralized controller device interconnected with a plurality of edge devices. A batch version of the machine learning model that operates in batch mode is hosted at the centralized controller device. Then, an incremental version of the machine learning model that operates in incremental mode is pushed to an edge device of the plurality of edge devices, such that the incremental version of the machine learning model is hosted at the edge device. As a result, the batch version and the incremental version of the machine learning model run in parallel with one another.

Illustratively, the techniques described herein may be performed by hardware, software, and/or firmware, such as in accordance with the "learning machine" process 248, which may include computer executable instructions executed by the processor 220 (or independent processor of interfaces 210) to perform functions relating to the techniques described herein, e.g., in conjunction with routing process 244. For example, the techniques herein may be treated as extensions to conventional protocols, such as the various PLC protocols or wireless communication protocols, and as such, may be processed by similar components understood in the art that execute those protocols, accordingly.

Operationally, active learning is a specific area of machine learning in which an algorithm is able to interactively query the information source to obtain a desired output (e.g., delay, link utilization, hop count, path speed, packet loss, path reliability, path bandwidth, throughput, load, MTU, and the like) for a new data point. The LM should be able to determine the measurement to make, according to a score (e.g., a weighted score) indicating an "optimality" of the input data point. This score may be computed only with input data information.

For example, in an LM-based approach for inferring the end-to-end delay of arbitrary paths in a network, a regression model (e.g., predictive model) may be used for estimating the delay of any link in the network based on a set of characteristic network properties. In turn, the regression model can be trained by adjusting its own estimates such that it matches the measured delays. Here, x may represent a vector of input data, generally indicating the state of the network at a given time t, and y may represent a target value, or in this case, the delay measurement (as an example). There are several variants in typical active learning settings, including: i) pool-based active learning, where a large pool of input data $x_1, x_2 \ldots x_n$ is available at any given time and ii) stream-based active learning, where the input data $x_1, x_2 \ldots x_n$ are made available sequentially (e.g., as a stream), one at a time. Notably, it is often the case that pool-based active learning is most feasible at the centralized datacenter in the cloud, where large amounts of data are available, while stream-based active learning is most feasible at the edge, where fresh streams of data are constantly being received.

In the context of IoT networks, the combination of reduced bandwidth between edge routers and the cloud (i.e., 3G link) and computational constraints on edge routers can prevent the use of batch algorithms at the edge in many cases. In view of this challenge, a hybrid architecture may be adopted whereby batch learning algorithms run in a centralized controller in the cloud, while incremental learning algorithms run on IoT routers at the edge. Further, dynamic collaboration between these algorithms is allowed, as explained below. By doing so, the outcome of both algorithms can be compared to one another against: i) convergence to local minima and ii) drastic changes in the network conditions (e.g., as a safeguard mechanism). This arrangement is particularly suitable to IoT networks because of the limited and/or expensive bandwidth (e.g., 3G, 4G, LTE) between the edge of the network and the datacenter. However, the embodiments disclosed herein are applicable to other network types (i.e., non-IoT cases), as well.

Figure 5:
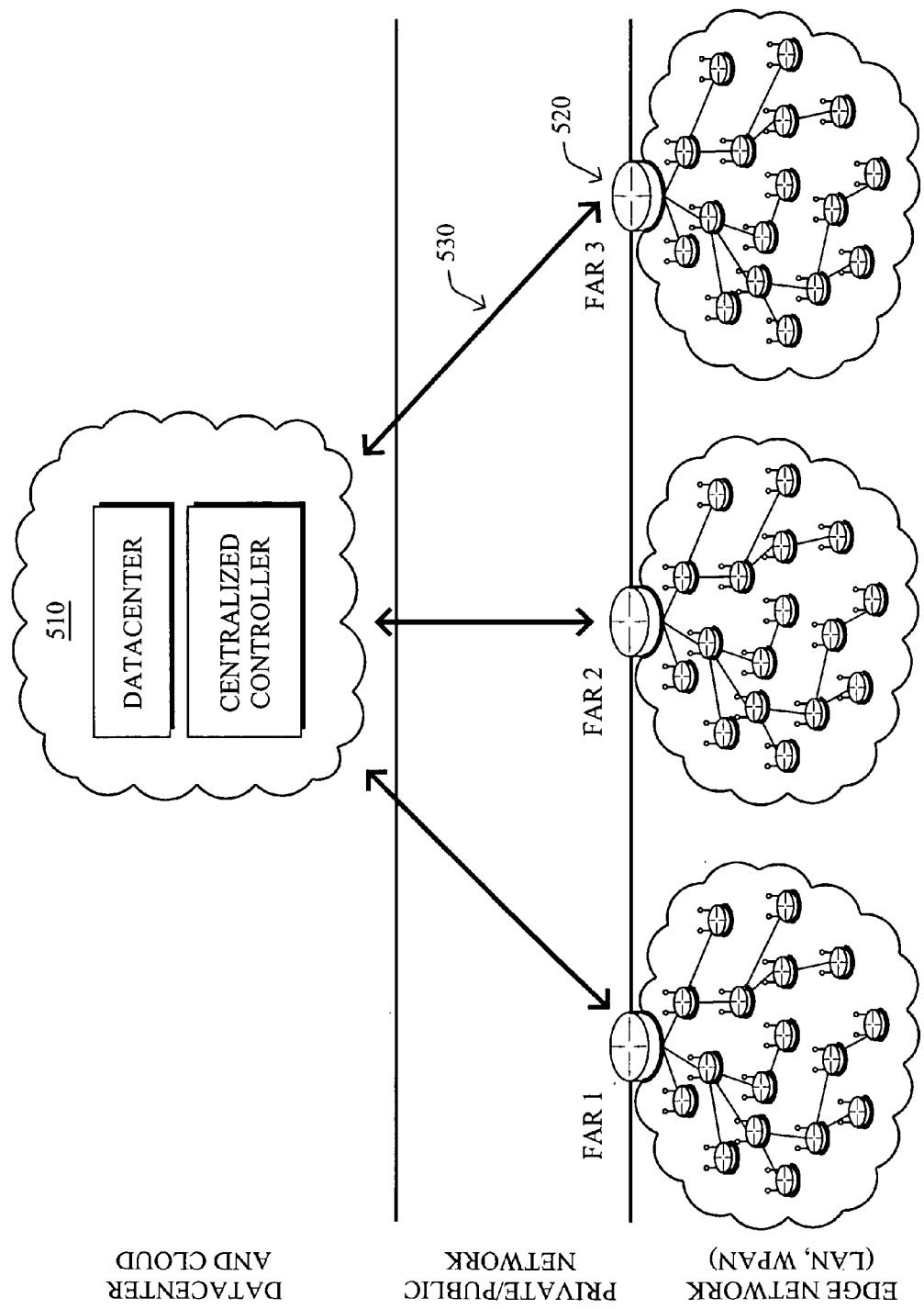
FIG. 5 illustrates a schematic representation of an example network including a centralized controller device interconnected with a plurality of edge devices.

FIG. 5 illustrates a schematic representation of an example network including a centralized controller device interconnected with a plurality of edge devices. As shown in FIG. 5, a centralized controller device 510 is interconnected with edge devices 520 via communication links 530. The centralized controller device 510 may represent a typical datacenter including computer systems, such as telecommunications or storage systems. The centralized controller device 510 may be located in the "cloud" and in communication with the edge devices 520 through a private/public network (e.g., the Internet, an intranet, etc.). The centralized controller device 510 may have expansive computing resources for long-term storage of data (e.g., data received from the edge devices 520), performing complex processing of the data, retrieving data upon request, and so forth.

The edge devices 520 may represent one or more FARs (e.g., FAR 1, FAR 2, and FAR 3) or other root nodes connected to multiple other network-enable devices (e.g., sensors, routers, etc.) in an "edge" network. Any number of edge devices 520 may be connected in the network. As shown in FIG. 1, the edge devices 520 may be interconnected with the devices (e.g., devices 110) by various methods of communication (e.g., links 105), where certain devices 110, such as, e.g., routers, sensors, computers, etc., may be in communication with other devices 110, e.g., based on distance, signal strength, current operational status, location, etc. The illustrative edge devices 520 may interconnect the local network (e.g., LAN, WPAN, etc.) with a private/public network, as described above.

Figure 6:
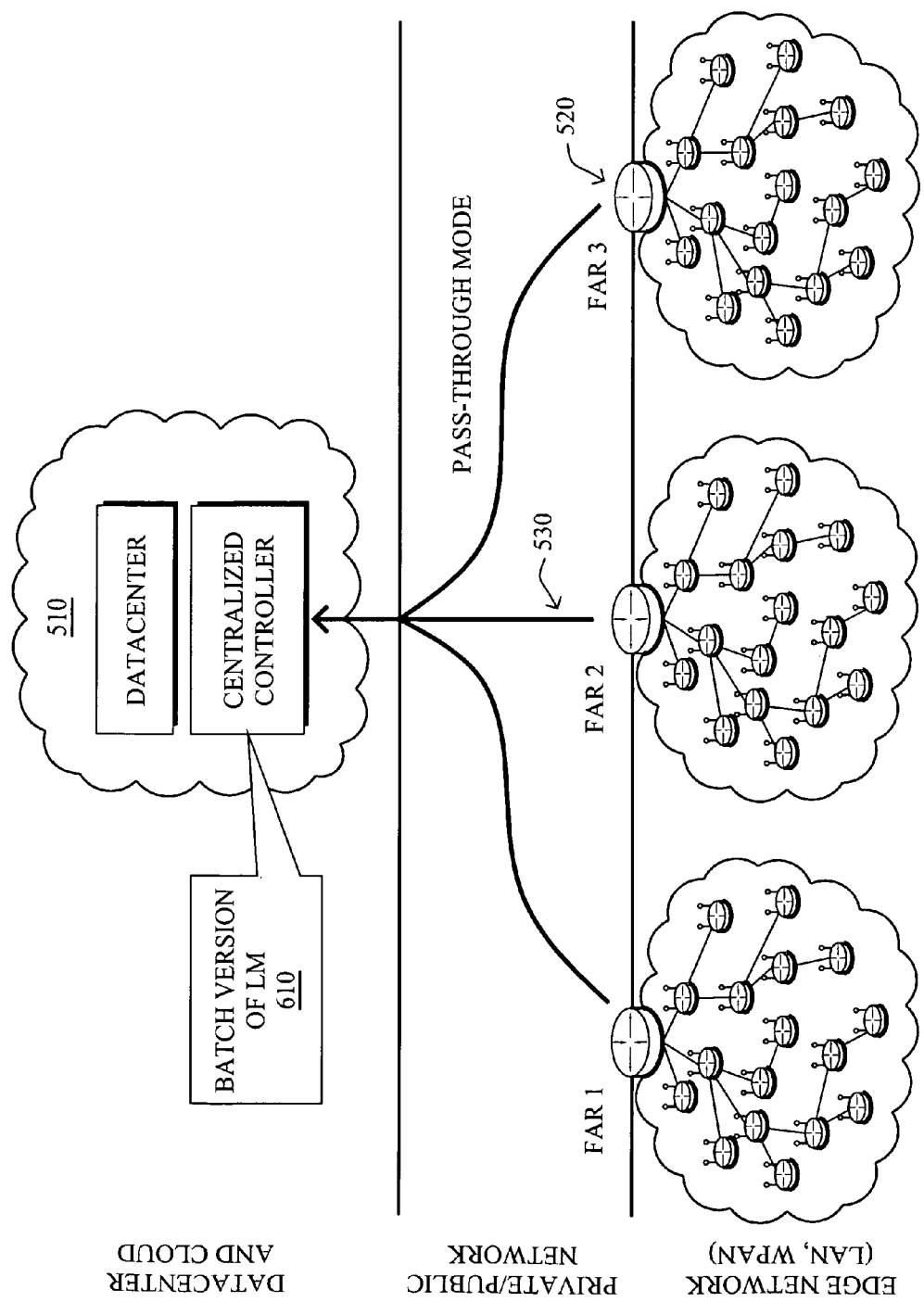
FIG. 6 illustrates a schematic representation of the example network operating in pass-through mode.

FIG. 6 illustrates a schematic representation of the example network operating in pass-through mode. Illustratively, a machine learning model is running in the network. The machine learning model may be used for predicting one or more network metrics, including, but not limited to, delay, link utilization, hop count, path speed, packet loss, path reliability, path bandwidth, throughput, load, maximum transmission unit (MTU), and the like. An example machine learning model includes a variational Bayesian least squares (VBLS) regression model, which is a type of algorithm currently deployed in IoT networks. However, the current embodiments are not limited to such an algorithm, but rather are applicable to any type of machine learning model that is operable in a computer network.

As shown in FIG. 6, a batch version 610 of the machine learning model (e.g., a regression model computed using a batch algorithm) may be hosted at the centralized controller device 510. The batch version 610 of the machine learning model may alternatively be referred to herein as the "batch version of LM" or simply, the "batch version." The batch version 610 of the machine learning model operates in batch mode, where a large dataset is collected, and the entire dataset is processed at once, as described above. The batch version 610 may be trained utilizing pool-based active learning techniques, as further described above, whereby the batch model takes large data sample sets as input.

The network configuration depicted in FIG. 6 may represent an initial stage in formulating the hybrid batch-incremental learning architecture disclosed herein. To this point, a time duration may be set (e.g., using a timer T), during which the FAR may work in pass-through mode. That is, all data received at the edge devices 520 may be forwarded to the centralized controller 510. During this time, a batch version 610 of the machine learning model may be trained in the datacenter 510 using the incoming forwarded data. Alternatively, if the timer T is set to zero, it is possible that no information is passed to the centralized controller 510, and the machine learning model can instead be trained locally (e.g., on the FAR 520) either using a batch or incremental algorithm. Conversely, as long as T>0, data may be redirected to the centralized controller device 510 from the edge devices 520 by forwarding packets (e.g., as an IP unicast message, such as a CoAP message) for a time duration that may be locally configured on each edge device 520.

The address of the centralized controller device 510 may be discovered upon registration of the FAR 520 or via the NMS, along with the set of data to be forwarded. Furthermore, the centralized controller device 510 may send an indication (e.g., as an IP unicast message) to the edge devices 520 to request them to stop sending data, which may be performed before the expiration of the timer T.

Figure 7:
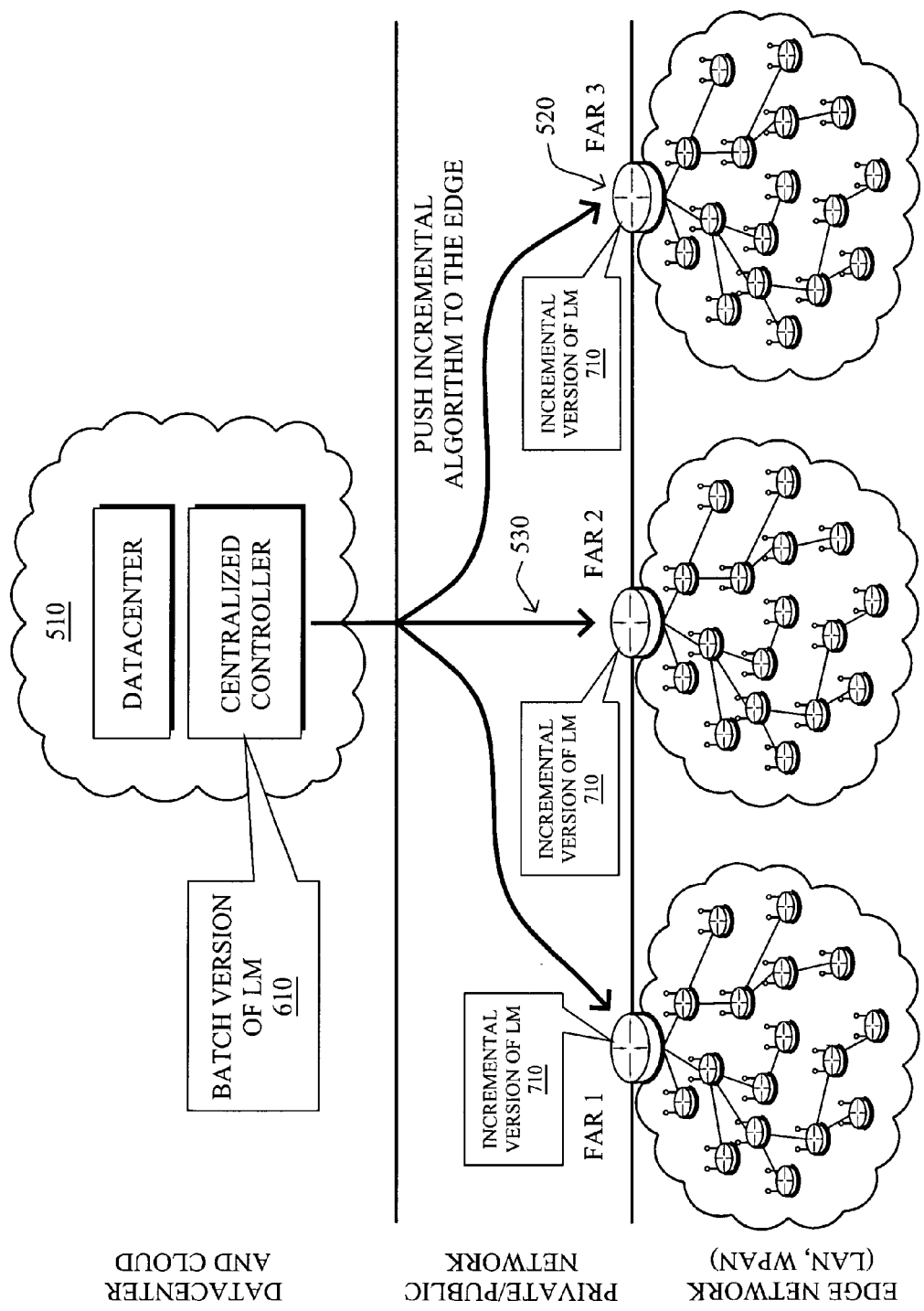
FIG. 7 illustrates a schematic representation of the example network where the incremental algorithm is pushed to the edge.

FIG. 7 illustrates a schematic representation of the example network where the incremental algorithm is pushed to the edge. As shown in FIG. 7, an incremental version 710 of the machine learning model (e.g., a regression model computed using an incremental algorithm) may be hosted at the edge devices 520. As a result, the batch version 610 of the machine learning model may be hosted at the centralized controller device 510 simultaneously with the incremental version 710 of the machine learning model being hosted at the edge devices 520. Thus, the batch version 610 of the machine learning model and the incremental version 710 of the machine learning model may run in parallel with one another in a distributed manner, thereby improving the convergence properties and overall reliability of these algorithms, as described further below. Indeed, this architecture intelligently distributes the computational load across the network, while taking into account the computational constraints and access to "fresh" data of each device in the network participating in the learning.

To this end, when the time duration set by the timer T expires, the batch version 610 of the machine learning model may be used to initialize an incremental version 710 of the machine learning model. Then, the incremental version 710 of the machine learning model may be bootstrapped on the edge device 520 based on its batch counterpart 610 trained in the centralized controller 510. In particular, the initialized incremental version 710 of the machine learning model can be pushed from the centralized controller 510 to the edge device 520 and proceed to be trained using incoming data at the edge device. The incremental version 710 may be trained utilizing stream-based active learning techniques, as further described above, whereby the incremental model is fed by every incoming data sample.

At any time, information relating to the regression model computed by the batch algorithm may be provided to one or more of the edge devices 520 hosting the incremental version 710 (e.g., as an IP unicast message). Also, the batch version 610 of the machine learning model may be hosted at the edge device for a relatively short period of time to assist in the initialization and/or training of the incremental version 710 of the machine learning model, thereby limiting the storage requirement, which is limited on such a low-end device, and the required CPU, as the amount of data to be processed is also limited. Alternatively, the batch algorithm 610 can be entirely hosted on the central controller 510.

Figure 8:
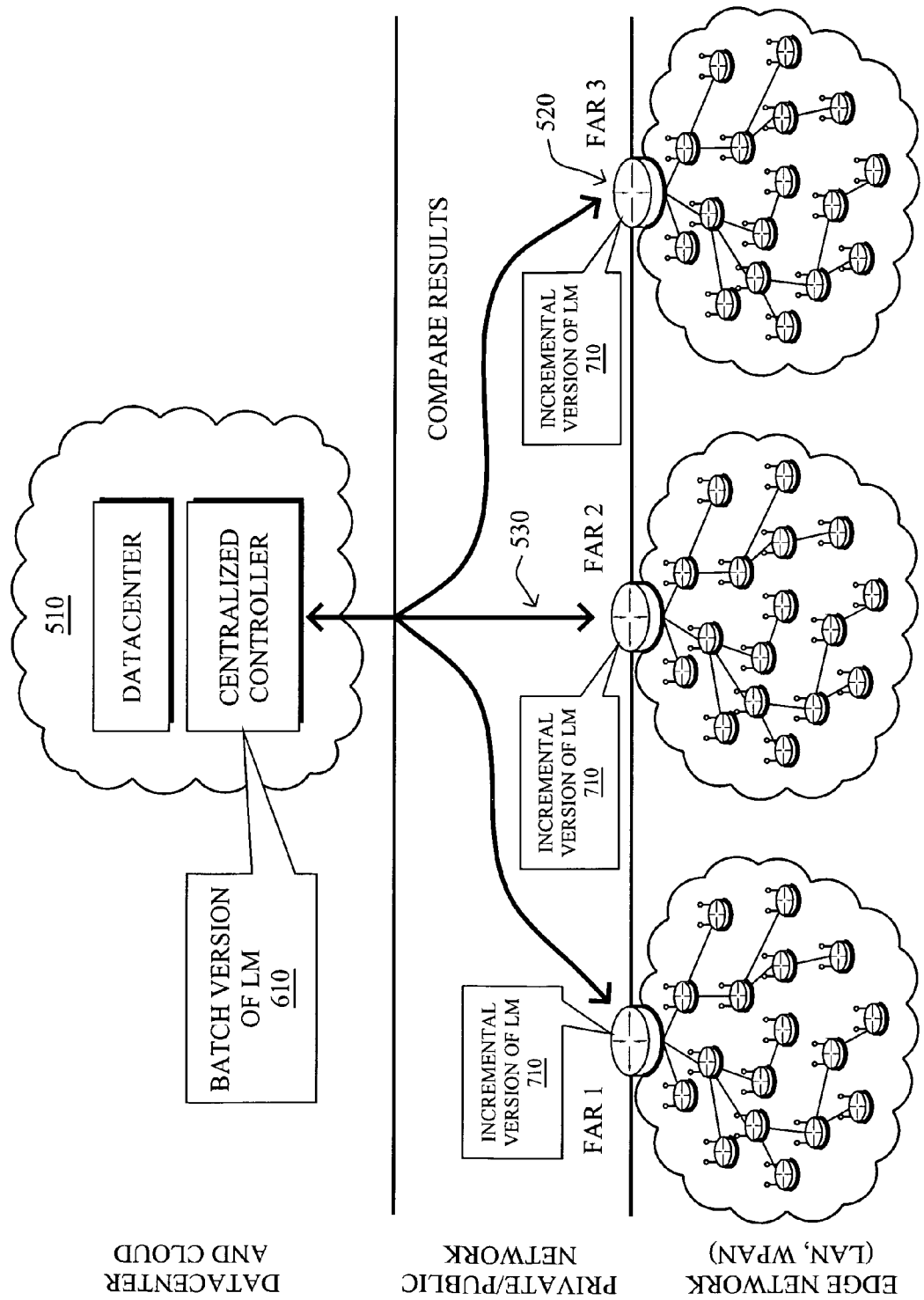
FIG. 8 illustrates a schematic representation of the example network where results of the batch version and the incremental version of the machine learning model are compared.

FIG. 8 illustrates a schematic representation of the example network where results of the batch version and the incremental version of the machine learning model are compared. As shown in FIG. 7, outcomes of the batch version 610 of the machine learning model and the incremental version 710 of the machine learning model are exchanged, and the batch version 610 and the incremental version 710 of the machine learning model can be cross-validated against each other. By doing so, the reliability and accuracy of predictions made by the machine learning model may be ensured, whereby a countermeasure can be performed should an outcome of the batch version 610 of the machine learning model substantially diverge from the outcomes of the incremental version 710 of the machine learning model (using the same data).

As explained above, after the initial stage, or upon expiration of the timer T, the edge devices 520 should no longer work in pass-through mode, where all incoming data is forwarded to the centralized controller device 510. Rather, the edge devices 520 may forward incoming data to the centralized controller device 510 at a reduced rate (e.g., upon quiet period and with high compression). As a result, two variants of the learning algorithm are running in parallel: 1) the batch algorithm 610 running in the controller 510 that is trained at discrete time intervals based on partial data forwarded from the edge devices 520, and 2) the incremental algorithm 710 running at the edge that is trained continuously using (typically large amounts of) incoming data.

After the incremental version 710 of the machine learning model has undergone some initial training using incoming data, the incremental version 710 may be pushed back to the centralized controller 510 at regular time intervals (e.g., as a IP unicast message). Alternatively, the batch version 610 of the machine learning model may be pushed back to the edge devices 520. This way, predictions (of a metric in the network, for example) made by the incremental version 710 of the machine learning model may be compared with those of its batch counterpart 610, as shown in FIG. 8, preferably using a set of recent data.

Figure 9:
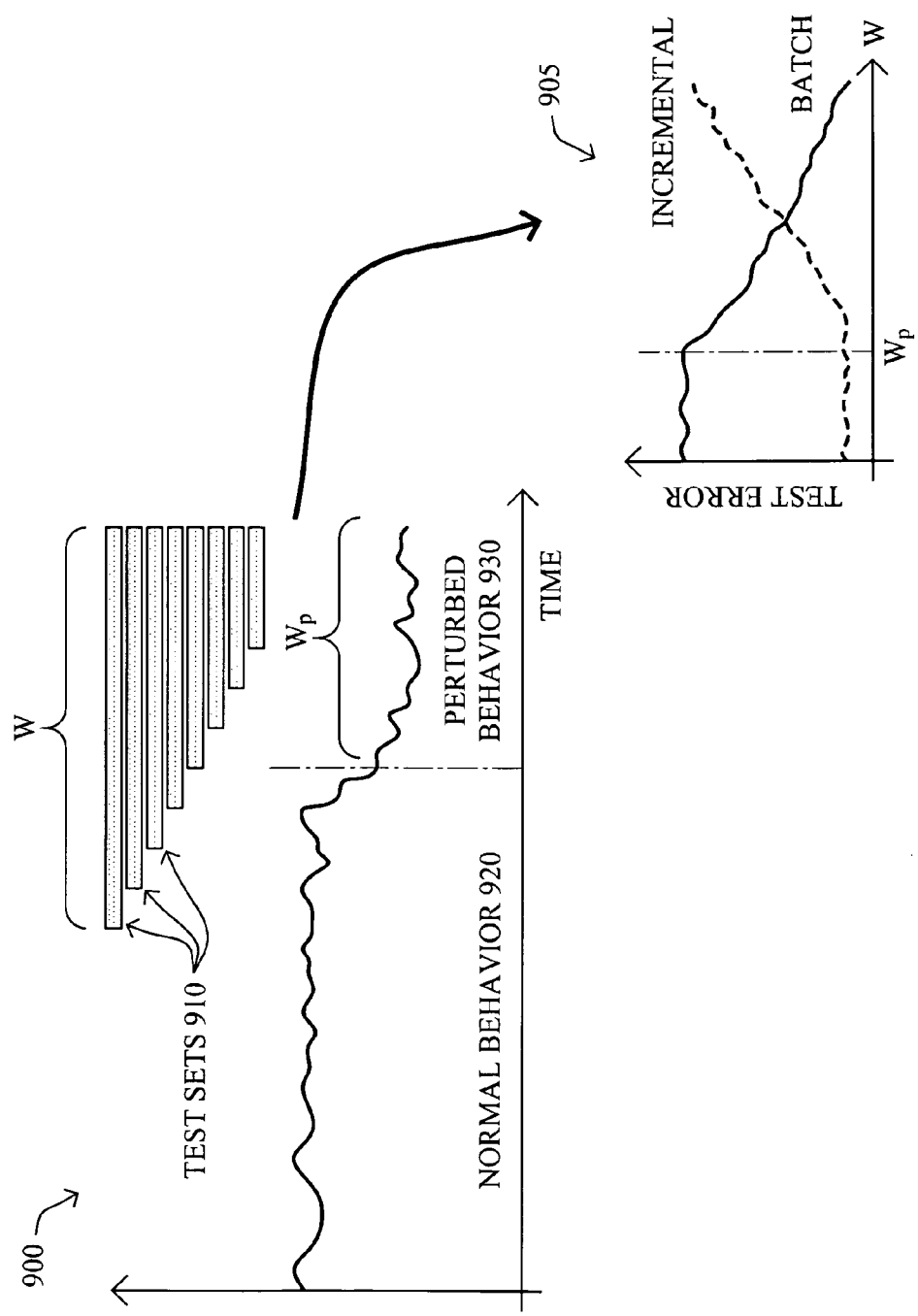
FIG. 9 illustrates an example of cross-validating the batch version and incremental version of the machine learning model.

When comparing the outcomes of the batch version 610 of the machine learning model to the outcomes of the incremental version 710 of the machine learning model, countermeasures may be taken should the predictions diverge in a statistically significant manner, whereby a threshold amount of divergence may be defined by the centralized controller device 510 and/or the edge devices 520. For example, in the case that the predictions are divergent, the incremental version 710 at the edge may be reset in order to account for a convergence problem and to adjust the forgetting rate. Additionally, or alternatively, the batch version 610 in the controller 510 may be reset in order to account for a drastic change in conditions of the incoming data at the edge. To this end, the centralized controller 510 may construct test sets from time windows [w, t] of increasing size w, and evaluate both algorithms against each test set 910 (as shown in FIG. 9). Generally, if one algorithm performs worse than the other for a given performance metric of interest, that algorithm should be the one to be reset by, for example, re-training the algorithm.

Furthermore, a parameter (e.g., forgetting rate) of the incremental version 710 of the machine learning model may be automatically adjusted, such that the incremental version 710 of the machine learning model is able to adapt to perturbations in network behavior at the edge device. In this regard, because the batch algorithm 610 is trained on a relatively large time window, it can basically represent a baseline, e.g., a model of a "normal behavior." However, it is preferable that the machine learning model is capable of adapting to abrupt changes in the network, e.g., "perturbed behavior," as well. This allows the machine learning model to react promptly to network variations (due to the incremental model 710), while obtaining a robust model for a steady network state (due to the batch model 610).

Thus, the forgetting rate of the incremental algorithm 710 may be fine-tuned so that the incremental algorithm 710 can handle the perturbed behavior when it occurs. In other words, by optimizing the forgetting rate, the incremental version 710 of the machine learning model may achieve the same performance as the batch version 610 of the machine learning model for normal behavior, while minimizing any performance loss during the perturbed behavior.

To this end, FIG. 9 illustrates an example of cross-validating the batch version and incremental version of the machine learning model. As shown in the table 900, the forgetting rate of the incremental version 710 of the machine learning model may be optimized via cross-validation on a dataset constructed from a time window $w_p$, which represents the transition from normal behavior 920 to perturbed behavior 930. Based on the test sets of varying time durations, the forgetting rate can be adjusted and optimized on the edge devices 520. Furthermore, the central controller device 510 may detect that a remote incremental algorithm 710 has been using an improper forgetting rate and may report the improper parameter to the edge devices 520.

Referring now to the table 905, as the time window w increases beyond $w_p$, the test error of the batch algorithm 610 may slowly decrease, since the batch version 610 has been trained based on the normal behavior 920, not the perturbed behavior 930. On the other hand, the test error of the incremental algorithm 710 may be low for $w<w_p$ and may increase beyond $w_p$, since the incremental version 710 has adapted to the perturbed behavior 930. As a result, should a countermeasure need to be taken, as explained above, comparing the test errors of the batch version 610 and the incremental version 710 of the machine learning model can determine which algorithm to reset. Moreover, it is apparent that the behavior of the network can be identified by monitoring the performance of the batch algorithm 610. In particular, if the batch version 610 of the machine learning model decreases in a statistically significant manner, it may be concluded that the behavior is perturbed, as illustrated in table 905.

Figure 10:
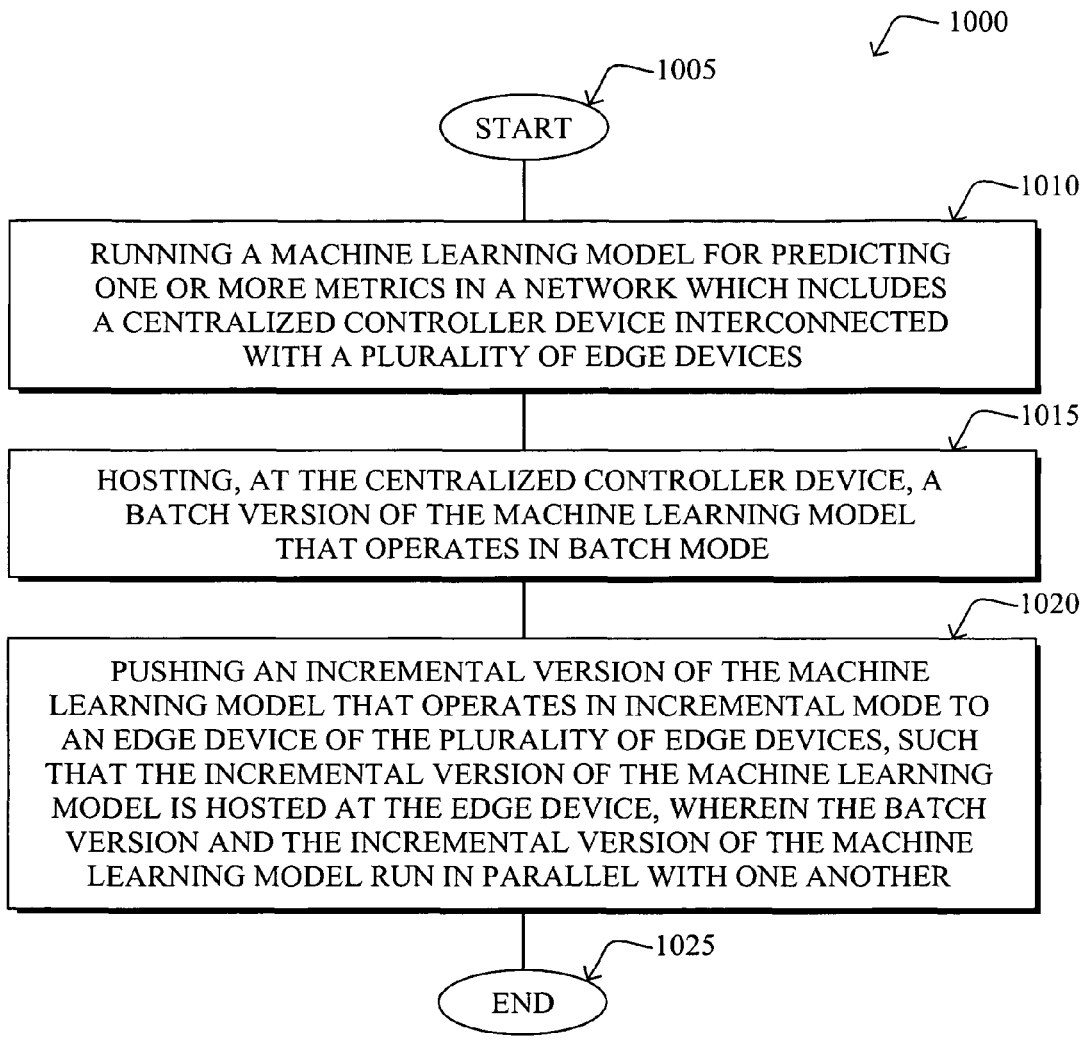
FIG. 10 illustrates an example simplified procedure for hierarchical hybrid batch-incremental learning.

FIG. 10 illustrates an example simplified procedure for hierarchical hybrid batch-incremental learning. The procedure 1000 may start at step 1005, and continues to step 1010, where, as described in greater detail above, a batch version and an incremental version of the machine learning model run in parallel with one another at a centralized controller and an edge router, respectively.

At step 1010, a machine learning model for predicting one or more metrics is run in a network which includes a centralized controller device interconnected with a plurality of edge devices. The machine learning model may be used for predicting one or more network metrics, including, but not limited to, delay, link utilization, hop count, path speed, packet loss, path reliability, path bandwidth, throughput, load, maximum transmission unit (MTU), and the like. An example machine learning model includes a variational Bayesian least squares (VBLS) regression model, which is a type of algorithm currently deployed in IoT networks. However, the current embodiments are not limited to such an algorithm, but rather are applicable to any type of machine learning model that is operable in a computer network.

At step 1015, a batch version of the machine learning model that operates in batch mode is hosted at the centralized controller device. The batch version of the machine learning model operates in batch mode, where a large dataset is collected, and the entire dataset is processed at once, as described above. The batch version may be trained utilizing pool-based active learning techniques, as further described above. More specifically, the batch version of the machine learning model may be trained in the datacenter using the data forwarded from the edge devices.

Then, at step 1020, an incremental version of the machine learning model that operates in incremental mode is pushed to an edge device of the plurality of edge devices, such that the incremental version of the machine learning model is hosted at the edge device. As a result, the batch version and the incremental version of the machine learning model run in parallel with one another.

The procedure 1000 illustratively ends at step 1025. The techniques by which the steps of procedure 1000 may be performed, as well as ancillary procedures and parameters, are described in detail above.

It should be noted that the steps shown in FIG. 10 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for hierarchical hybrid batch-incremental learning. In particular, the techniques herein propose a distributed computing architecture whereby the respective advantages of batch algorithms and incremental algorithms are emphasized, while their respective limitations are mitigated. By using incremental learning at the edge, memory usage and adaptive latency are minimized. By using batch learning in the datacenter, the convergence of incremental algorithms at the edge can be ensured, and free parameters of these algorithms (e.g., the forgetting rate) may be automatically optimized.

While there have been shown and described illustrative embodiments that provide for intelligent probing techniques in computer networks, it is to be understood that various other adaptations and modifications may be made within the spirit and scope of the embodiments herein. For example, the embodiments have been shown and described herein with relation to LLNs. However, the embodiments in their broader sense are not as limited, and may, in fact, be used with other types of networks and/or protocols. In addition, while certain protocols are shown, such as RPL, other suitable protocols may be used, accordingly. Further, the network arrangements, and particularly the configuration of network devices, are depicted herein for demonstration purposes only and should not be treated as limited the disclosed embodiments.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as an apparatus that comprises at least one network interface that communicates with a communication network, a processor coupled to the at least one network interface, and a memory configured to store program instructions executable by the processor. Further, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
running a machine learning model for predicting one or more metrics in a network which includes a centralized controller device interconnected with a plurality of edge devices;
hosting, at the centralized controller device, a batch version of the machine learning model that operates in batch mode; and
pushing an incremental version of the machine learning model that operates in incremental mode to an edge device of the plurality of edge devices, such that the incremental version of the machine learning model is hosted at the edge device,
wherein the batch version and the incremental version of the machine learning model run in parallel with one another.

2. The method as in claim 1, further comprising:
training the batch version of the machine learning model using incoming data at the edge device that is forwarded to the centralized controller device.

3. The method as in claim 2, further comprising:
initiating the incremental version of the machine learning model based on the trained batch version of the machine learning model.

4. The method as in claim 1, wherein the incremental version of the machine learning model is trained using incoming data at the edge device.

5. The method as in claim 1, wherein the batch version of the machine learning model is hosted at the edge device for a relatively short period of time.

6. The method as in claim 1, further comprising:
periodically training the batch version of the machine learning model using data periodically forwarded from the edge device, wherein the incremental version of the machine learning model is continuously trained at the edge device using the data.

7. The method as in claim 1, further comprising:
evaluating the reliability of predictions made by the machine learning model by comparing an outcome of the batch version of the machine learning model to an outcome of the incremental version of the machine learning model.

8. The method as in claim 7, further comprising:
performing a countermeasure when the outcome of the batch version of the machine learning model substantially diverges from the outcome of the incremental version of the machine learning model, wherein
the countermeasure includes one or both of: resetting the batch version of the machine learning model and resetting the incremental version of the machine learning model.

9. The method as in claim 1, further comprising:
comparing the batch version of the machine learning model to the incremental version of the machine learning model against a plurality of test data sets.

10. The method as in claim 1, further comprising:
automatically adjusting a parameter of the incremental version of the machine learning model, such that the incremental version of the machine learning model is able to adapt to perturbations in network behavior at the edge device.

11. The method as in claim 10, further comprising:
detecting the perturbations in network behavior by monitoring the performance of the batch version of the machine learning model.

12. An apparatus, comprising:
one or more network interfaces to communicate with a network;
a processor coupled to the one or more network interfaces and adapted to execute a process; and
a memory configured to store program instructions which include the process executable by the processor, the process comprising:
running a machine learning model for predicting one or more metrics in the network which includes a centralized controller device interconnected with a plurality of edge devices;
hosting, at the centralized controller device, a batch version of the machine learning model that operates in batch mode;
pushing an incremental version of the machine learning model that operates in incremental mode to an edge device of the plurality of edge devices, such that the incremental version of the machine learning model is hosted at the edge device,
wherein the batch version and the incremental version of the machine learning model run in parallel with one another.

13. The apparatus as in claim 12, wherein the process further comprises:
training the batch version of the machine learning model using incoming data at the edge device that is forwarded to the centralized controller device.

14. The apparatus as in claim 13, wherein the process further comprises:
initiating the incremental version of the machine learning model based on the trained batch version of the machine learning model.

15. The apparatus as in claim 12, wherein the incremental version of the machine learning model is trained using incoming data at the edge device.

16. The apparatus as in claim 12, wherein the batch version of the machine learning model is hosted at the edge device for a relatively short period of time.

17. The apparatus as in claim 12, wherein the process further comprises:
periodically training the batch version of the machine learning model using data periodically forwarded from the edge device, wherein the incremental version of the machine learning model is continuously trained at the edge device using the data.

18. The apparatus as in claim 12, wherein the process further comprises:
evaluating the reliability of predictions made by the machine learning model by comparing an outcome of the batch version of the machine learning model to an outcome of the incremental version of the machine learning model.

19. The apparatus as in claim 18, wherein the process further comprises:
performing a countermeasure when the outcome of the batch version of the machine learning model substantially diverges from the outcome of the incremental version of the machine learning model, wherein
the countermeasure includes one or both of: resetting the batch version of the machine learning model and resetting the incremental version of the machine learning model.

20. The apparatus as in claim 12, wherein the process further comprises:
comparing the batch version of the machine learning model to the incremental version of the machine learning model against a plurality of test data sets.

21. The apparatus as in claim 12, wherein the process further comprises:
automatically adjusting a parameter of the incremental version of the machine learning model, such that the incremental version of the machine learning model is able to adapt to perturbations in network behavior at the edge device.

22. The apparatus as in claim 21, wherein the process further comprises:
detecting the perturbations in network behavior by monitoring the performance of the batch version of the machine learning model.

23. A tangible non-transitory computer readable medium storing program instructions that cause a computer to execute a process, the process comprising:
running a machine learning model for predicting one or more metrics in a network which includes a centralized controller device interconnected with a plurality of edge devices;
hosting, at the centralized controller device, a batch version of the machine learning model that operates in batch mode;
pushing an incremental version of the machine learning model that operates in incremental mode to an edge device of the plurality of edge devices, such that the incremental version of the machine learning model is hosted at the edge device,
wherein the batch version and the incremental version of the machine learning model run in parallel with one another.

* * * * *